(12) United States Patent
Weaver et al.

(10) Patent No.: US 7,591,313 B2
(45) Date of Patent: Sep. 22, 2009

(54) METHODS OF TREATING PARTICULATES AND USE IN SUBTERRANEAN FORMATIONS

(75) Inventors: Jim D. Weaver, Duncan, OK (US); Billy F. Slabaugh, Duncan, OK (US); Robert E. Hanes, Jr., Oklahoma City, OK (US); Diederik van Batenburg, Delft (NL); Mark A. Parker, Marlow, OK (US); Matthew E. Blauch, Duncan, OK (US); Neil A. Stegent, Cypress, TX (US); Philip D. Nguyen, Duncan, OK (US); Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/776,956

(22) Filed: Jul. 12, 2007

(65) Prior Publication Data
US 2008/0015119 A1    Jan. 17, 2008

Related U.S. Application Data

(62) Division of application No. 11/133,697, filed on May 20, 2005, now abandoned.

(51) Int. Cl.
*E21B 43/04* (2006.01)
*E21B 43/22* (2006.01)
*E21B 43/267* (2006.01)

(52) U.S. Cl. .................. 166/280.2; 166/276; 166/278; 166/295; 166/305.1; 166/308.2; 166/308.3; 507/204; 507/924

(58) Field of Classification Search ....................... None
See application file for complete search history.

(56) References Cited

U.S. PATENT DOCUMENTS

| | | | |
|---|---|---|---|
| 3,163,212 A | 12/1964 | Bermard | |
| 3,343,599 A | 9/1967 | Eddins, Jr. et al. | |
| 3,437,145 A | 4/1969 | Johnson et al. | 166/295 |
| 3,438,443 A | 4/1969 | Prats et al. | 166/303 |
| 3,815,680 A | 6/1974 | McGuire et al. | |
| 4,074,536 A | 2/1978 | Young | 405/264 |
| 4,323,124 A | 4/1982 | Swan | 166/303 |
| 4,425,384 A * | 1/1984 | Brownscombe | 427/221 |
| 4,432,881 A | 2/1984 | Evani | |
| 4,475,595 A | 10/1984 | Watkins et al. | 166/303 |
| 4,572,296 A | 2/1986 | Watkins | 166/303 |
| 4,579,176 A | 4/1986 | Davies et al. | 166/303 |
| 4,582,137 A | 4/1986 | Schmitt | |
| 4,606,227 A | 8/1986 | Walters | 73/432 |
| 4,681,854 A | 7/1987 | Feazel | 436/31 |
| 4,814,096 A | 3/1989 | Evani | |
| 4,898,750 A | 2/1990 | Friedman et al. | 427/221 |
| 4,913,236 A | 4/1990 | Reed | 166/303 |
| 4,922,758 A | 5/1990 | Penny | 73/38 |
| 4,997,582 A | 3/1991 | Clark, Jr. et al. | |
| 5,240,075 A | 8/1993 | Burrows et al. | 166/303 |
| 5,249,627 A | 10/1993 | Harms et al. | 166/308 |
| 5,393,439 A | 2/1995 | Laramay et al. | 507/211 |
| 5,582,249 A | 12/1996 | Caveny et al. | 166/276 |
| 5,721,313 A | 2/1998 | Young et al. | |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,867,549 A | 2/1999 | Lindquist et al. | 376/306 |
| 6,311,773 B1 | 11/2001 | Todd et al. | 166/280.2 |
| 6,439,309 B1 | 8/2002 | Matherly et al. | 166/276 |
| 6,660,693 B2 | 12/2003 | Miller et al. | 507/136 |
| 6,729,408 B2 | 5/2004 | Hinkel et al. | 166/308 |
| 6,920,928 B1 | 7/2005 | Davies et al. | |
| 7,040,403 B2 | 5/2006 | Nguyen et al. | |
| 7,131,491 B2 | 11/2006 | Blauch et al. | 166/276 |
| 2003/0188872 A1 | 10/2003 | Nguyen et al. | 166/308 |
| 2005/0070679 A1 | 3/2005 | Breuer et al. | 526/317.1 |
| 2005/0079981 A1 | 4/2005 | Nguyen et al. | 507/200 |

(Continued)

FOREIGN PATENT DOCUMENTS

WO    WO 03/015523 A2    2/2003

(Continued)

OTHER PUBLICATIONS

Foreign communication related to a counterpart application dated Aug. 28, 2006.

(Continued)

*Primary Examiner*—George Suchfield
(74) *Attorney, Agent, or Firm*—Robert A. Kent; Baker Botts L.L.P.

(57) ABSTRACT

Provided are methods of modifying the surface stress-activated reactivity of proppant particulates used in subterranean operations. In one embodiment, the methods comprise: providing a plurality of particulates, at least one of which comprises a mineral surface; providing a surface-treating reagent capable of modifying the stress-activated reactivity of a mineral surface of a particulate; and allowing the surface-treating reagent modify the stress-activated reactivity of at least a portion of the mineral surface of at least one particulate. In other embodiments, the methods comprise the use of particulates comprising a modified mineral surface in fluids introduced into subterranean formations.

23 Claims, No Drawings

U.S. PATENT DOCUMENTS

| | | |
|---|---|---|
| 2005/0092489 A1 | 5/2005 | Welton et al. |
| 2005/0107263 A1 | 5/2005 | Bland et al. |
| 2005/0277554 A1 | 12/2005 | Blauch et al. ............... 507/224 |
| 2007/0079965 A1 | 4/2007 | Nguyen et al. |

FOREIGN PATENT DOCUMENTS

| | | |
|---|---|---|
| WO | WO 03/097996 A1 | 11/2003 |
| WO | WO 2004/096940 A1 | 11/2004 |

OTHER PUBLICATIONS

Office Action for U.S. Appl. No. 11/251,493, dated Aug. 14, 2007.

Notice of Allowance and Notice of Allowability for U.S. Appl. No. 11/251,493, dated Feb. 29, 2008.

* cited by examiner

METHODS OF TREATING PARTICULATES AND USE IN SUBTERRANEAN FORMATIONS

CROSS-REFERENCE TO RELATED APPLICATIONS

This application is a divisional application of U.S. patent application Ser. No. 11/133,697, entitled "Methods of Treating Particulates and Use in Subterranean Formations," filed on May 20, 2005 now abandoned, the entirety of which is herein incorporated by reference.

BACKGROUND

The present invention relates to treatments useful in subterranean operations, and more particularly, to methods of modifying the surface stress-activated reactivity of proppant particulates used in subterranean operations.

In the production of hydrocarbons from a subterranean formation, the subterranean formation should be sufficiently conductive to permit the flow of desirable fluids to a well bore penetrating the formation. One type of treatment used in the art to increase the conductivity of a subterranean formation is hydraulic fracturing. Hydraulic fracturing operations generally involve pumping a treatment fluid (e.g., a fracturing fluid or a "pad fluid") into a well bore that penetrates a subterranean formation at a sufficient hydraulic pressure to create or enhance one or more pathways, or "fractures," in the subterranean formation. These cracks generally increase the permeability of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore.

One problem that may affect fluid conductivity in the formation after a fracturing treatment is the tendency for particulates (e.g., formation fines, proppant particulates, etc.) to flow back through the conductive channels in the subterranean formation, which can, for example, clog the conductive channels and/or damage the interior of the formation or equipment placed in the formation. One well-known technique to prevent these problems is to treat the associated portions of a subterranean formation with a hardenable resin to hopefully consolidate any loose particulates therein and to prevent their flow-back. Another technique used to prevent flow-back problems, commonly referred to as "gravel packing," involves the placement of a gravel screen in the subterranean formation, which acts as a barrier that prevents particulates from flowing into the well bore.

The surfaces of proppant particulates generally comprise one or more minerals, which may react with other substances (e.g., water, minerals, treatment fluids, and the like) that reside in the subterranean formation in chemical reactions caused, at least in part, by conditions created by mechanical stresses on those minerals (e.g., fracturing of mineral surfaces, compaction of mineral particulates). These reactions are herein referred to as "stress-activated reactions" or "stress-activated reactivity." One type of these stress-activated reactions is diageneous reactions. As used herein, the terms "diageneous reactions," "diageneous reactivity," and "diagenesis" are defined to include chemical and physical processes that move a portion of the mineral in a proppant particulate and/or convert a portion of the mineral in a proppant particulate into some other form in the presence of water. A mineral that has been so moved or converted is herein referred to as a "diageneous product." Any proppant particulate comprising a mineral may be susceptible to these diageneous reactions, including natural silicate minerals (e.g., quartz), man-made silicates and glass materials, metal oxide minerals (both natural and man-made), and the like.

Two of the principle mechanisms that diagenesis reactions are thought to involve are pressure solution and precipitation processes. Where two water-wetted mineral surfaces are in contact with each other at a point under strain, the localized mineral solubility near that point increases, causing the minerals to dissolve. Minerals in solution may diffuse through the water film outside of the region where the mineral surfaces are in contact (e.g., the pore spaces of a proppant pack), where they may precipitate out of solution. The dissolution and precipitation of minerals in the course of these reactions may reduce the conductivity of the proppant pack by, inter alia, clogging the pore spaces in the proppant pack with mineral precipitate and/or collapsing the pore spaces by dissolving solid minerals in the "walls" of those pore spaces. In other instances, minerals on the surface of a proppant particulate also may exhibit a tendency to react with substances in formation fluids and/or treatment fluids that are in contact with the particulates, such as water, gelling agents (e.g., polysaccharides, biopolymers, etc.), and other substances commonly found in these fluids, whose molecules may become anchored to the mineral surface of the particulate. These types of reactivity may, inter alia, further decrease the conductivity of a subterranean formation through, inter alia, the obstruction of conductive fractures in the formation by any molecules that have become anchored to the proppant particulates resident within those fractures.

Another problem that may affect the conductivity of a formation arises as a result of the proppant particulates being under pressure while in contact with the surfaces of the subterranean formation, which can cause them to become embedded in the surfaces of the formation. This may damage the formation by forming "craters" therein. Among other things, these "craters" may be a source of damage to the formation and/or reduce the conductivity of the formation by reducing the width of fractures in which the proppant particulates reside. It is a known practice in the art to coat proppant particulates with resins and/or other substances to increase the ability of the proppant to withstand the pressure in a subterranean formation without becoming embedded in the surfaces of the formation.

SUMMARY

The present invention relates to treatments useful in subterranean operations, and more particularly, to methods of modifying the surface stress-activated reactivity of proppant particulates used in subterranean operations.

In one embodiment, the present invention provides a method comprising: providing a plurality of particulates, at least one of which comprises a mineral surface; providing a surface-treating reagent capable of modifying the stress-activated reactivity of a mineral surface of a particulate; and allowing the surface-treating reagent to modify the stress-activated reactivity of at least a portion of the mineral surface of at least one particulate.

In another embodiment, the present invention provides a method of treating a subterranean formation comprising: providing a treatment fluid that comprises a base fluid, a plurality of particulates, at least one of which comprises a mineral surface, and a surface-treating reagent capable of modifying the stress-activated reactivity of a mineral surface of a particulate; allowing the surface-treating reagent to modify the stress-activated reactivity of at least a portion of the mineral surface of at least one particulate; and introducing the treatment fluid into the subterranean formation.

In another embodiment, the present invention provides a method of treating a subterranean formation comprising: providing a treatment fluid that comprises a base fluid and a plurality of particulates, at least one of which comprises a modified mineral surface; and introducing the treatment fluid into the subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to treatments useful in subterranean operations, and more particularly, to methods of modifying the surface stress-activated reactivity of proppant particulates used in subterranean operations. The methods of the present invention are directed to modifying the surface stress-activated reactivity of proppant particulates having a mineral surface that are used in subterranean operations, and the use of particulates having mineral surfaces that have been so modified.

The term "mineral surface" as used herein refers to a surface of a particulate that comprises one or more minerals and/or has one or more minerals resident on at least a portion of its outer surfaces. The minerals on the mineral surface of the particulates treated herein may include, for example, natural silicate minerals (e.g., quartz), man-made silicates and glass materials, metal oxide minerals (both natural and man-made), and the like. The mineral surfaces of particulates may interact with each other, fluids resident in the subterranean formation (e.g., formation fluids, treatment fluids, etc.), and/or surfaces of the subterranean formation (e.g., internal surfaces or "walls" of a fracture, herein referred to as "fracture faces") in such a way that affects conductivity of a subterranean formation. For example, the mineral surfaces of particulates in a proppant pack may undergo diageneous reactions that produce a product (e.g., a mineral precipitate) that is capable of, inter alia, clogging the pore spaces in the proppant pack. Thus, one object of the present invention is to preserve and enhance conductivity within a subterranean formation so that the maximum value of a fracturing treatment with respect to increased conductivity may be realized. Other objects of the present invention include, but are not limited to, preventing build-up of filter cake and/or gel residue in conductive channels (e.g., fractures) within a subterranean formation, and preventing the embedment of particulates into the surfaces of a subterranean formation.

The term "modifying the stress-activated reactivity of a mineral surface" and its derivatives as used herein refer to increasing or decreasing the tendency of a mineral surface to undergo one or more stress-activated reactions, or attaching a compound to the mineral surface that is capable of participating in one or more subsequent reactions with a second compound. In some embodiments, modifying the stress-activated reactivity of a mineral surface may comprise increasing or decreasing the tendency of a mineral surface to undergo diageneous reactions, or increasing or decreasing the tendency of a mineral surface to chemically react with one or more compounds (e.g., a gelling agent) in a fluid in contact with the mineral surface. A mineral surface whose reactivity has been modified according to this definition is herein referred to as "a modified mineral surface." In certain embodiments of the present invention, modifying the stress-activated reactivity of a mineral surface may comprise depositing one or more compounds on the mineral surface of a particulate that are capable of affecting the ability of the mineral surface to interact with any aqueous fluid that may be present in a subterranean formation, for example, by hindering or preventing the water-wetting of that mineral surface. Such compounds may be hydrophobic or hydrophilic in nature. In certain embodiments, the one or more compounds may be deposited so as to form an insulating film on the mineral surface.

The methods of the present invention generally comprise providing a plurality of particulates that comprise a modified mineral surface, or providing a plurality of particulates and a surface-treating reagent capable of modifying the stress-activated reactivity of the mineral surface of the particulates. In some embodiments, the modification may increase the tendency of a mineral surface to undergo stress-activated reactions; in other embodiments, the modification may lessen the tendency of a mineral surface to undergo stress-activated reactions.

1. Particulates

The particulates suitable for use in the present invention comprise any particulate that comprises a mineral surface. It should be understood that the term "particulate," as used in this disclosure, includes all known shapes of materials including substantially spherical materials, fibrous materials, polygonal materials (such as cubic materials) and mixtures thereof. Suitable particulates include, but are not limited to, sand, bauxite, ceramic materials, glass materials (e.g., glass beads), polymer materials, Teflon® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, ground cellulose fiber, and combinations thereof. The particulates may have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. Moreover, fibrous materials that may or may not be used to bear the pressure of a closed fracture, are often included in proppant and gravel treatments.

2. Suitable Surface-Treating Reagents

The surface-treating reagents utilized in the methods of the present invention generally comprise any compound that is capable of modifying the stress-activated reactivity of a mineral surface (as defined above). The surface-treating reagent may comprise a compound that increases or decreases the tendency of a mineral surface to undergo one or more stress-activated reactions (e.g., diagenous reactions, reactions with gelling agent molecules, etc.), or a compound that may is capable of undergoing a subsequent reaction with another compound. The surface-treating reagent may modify the stress-activated reactivity of a mineral surface in any number of ways, depending on the type of reagent used. For example, molecules of the surface-treating reagent may form covalent bonds with molecules on the mineral surface, or interact with molecules on the mineral surface via ionic interactions and/or van der Waals interactions. In certain embodiments, the surface-treating reagent may be present in an amount in the range of from about 0.003 pounds to about 0.5 pounds per square foot of surface area of mineral surface treated on the particulates. In certain embodiments, the surface-treating reagent may be present in an amount in the range of from about 0.03 pounds to about 0.12 pounds per square foot of surface area of mineral surface treated on the particulates. The type and amount of surface-treating reagents included in a particular method of the present invention may depend upon, among other factors, the chemical composition of formation fluids where the particulates are to be placed, flow rate of those formation fluids, the existing reactivity of the mineral surface, the desired resultant reactivity of the mineral surface, temperature, and the like.

a. Stress-Activated Reactivity-Reducing Reagents

In some embodiments, the surface-treating reagent may comprise compounds that are capable of decreasing the tendency of a mineral surface of a particulate to undergo one or more stress-activated reactions (e.g., diagenous reactions, reactions with gelling agent molecules, etc.). Such reagents are herein referred to as "stress-activated reactivity-reducing reagents." Suitable stress-activated reactivity-reducing reagents include, but are not limited to, resins, tackifying agents, and other substances that are capable of hindering or preventing the water-wetting of the mineral surface. Stress-activated reactivity-reducing reagents suitable for use in the present invention may be capable of increasing the water contact angle of a surface by at least about 20 degrees. These stress-activated reactivity-reducing reagents may be capable of performing these functions in any number of ways. In certain embodiments, the reagent may react with the minerals on the surfaces being treated to make them less susceptible to diagenous reactions. In certain embodiments, the reagent may react with the minerals on the surfaces being treated to make them less likely to chemically react with one or more compounds (e.g., a gelling agent) in a fluid in contact with the mineral surface. In certain embodiments, the reagent may be deposited on the mineral surface to form a barrier or film that hinders or prevents the mineral surface from interacting with any aqueous fluid that may be present in the subterranean formation.

i. Tackifying Agents

Tackifying agents suitable for use in the present invention include non-aqueous tackifying agents, aqueous tackifying agents, and silyl-modified polyamides. Certain such tackifying agents suitable for use in the present invention may be capable of increasing the water contact angle of a surface by at least about 20 degrees. One group of non-aqueous tackifying agents suitable for use in the present invention comprises polyamides that are liquids or in solution at the temperature of the particulates such that they are, by themselves, non-hardening when placed in contact with the particulates. An example of one such tackifying agent is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. In certain embodiments, a non-aqueous tackifying agent may comprise an isopropyl alcohol solution of about 3% polyamides by volume of the solution. Additional compounds which may be used as non-aqueous tackifying compounds include liquids and solutions of, for example, polyesters, polycarbonates, polycarbamates, natural resins such as shellac, and the like. Other suitable non-aqueous tackifying agents are described in U.S. Pat. No. 5,853,048 issued to Weaver, et al., U.S. Pat. No. 5,833,000 issued to Weaver, et al., U.S. Pat. No. 5,582,249 issued to Weaver, et al., U.S. Pat. No. 5,775,425 issued to Weaver, et al., and U.S. Pat. No. 5,787,986 issued to Weaver, et al., the relevant disclosures of which are herein incorporated by reference. In certain embodiments, the non-aqueous tackifying agent may be present in an amount in the range of from about 0.003 pounds to about 0.5 pounds per square foot of surface area of mineral surface treated on the particulates. In certain embodiments, the non-aqueous tackifying agent may be present in an amount in the range of from about 0.03 pounds to about 0.12 pounds per square foot of surface area of mineral surface treated on the particulates.

Non-aqueous tackifying agents suitable for use in the present invention may be either used such that they form a non-hardening coating, or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01% to about 50% by weight of the tackifying compound to effect formation of the reaction product. In some preferable embodiments, the compound is present in an amount of from about 0.5% to about 1% by weight of the tackifying compound. Suitable multifunctional materials are described in U.S. Pat. No. 5,839,510 issued to Weaver, et al., the relevant disclosure of which is herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof.

Aqueous tackifying agents suitable for use in the present invention are not significantly tacky when placed onto a mineral surface, but are capable of being "activated" (that is destabilized, coalesced and/or reacted) to transform the compound into a sticky, tackifying compound at a desirable time.

In some embodiments, a pretreatment may be first contacted with the mineral surface to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agent, inter alia, may enhance the grain-to-grain contact between individual particulates (be they proppant particulates, formation fines, or other particulates) and/or helping bring about the consolidation of the particulates into a cohesive, flexible, and permeable mass. In certain embodiments, the aqueous tackifying agent may be present in an amount in the range of from about 0.003 pounds to about 0.5 pounds per square foot of surface area of mineral surface treated on the particulates. In certain embodiments, the aqueous tackifying agent may be present in an amount in the range of from about 0.03 pounds to about 0.12 pounds per square foot of surface area of mineral surface treated on the particulates.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifying agents and additional disclosure on aqueous tackifying agents can be found in U.S. patent application Ser. No. 10/864,061, filed Jun. 9, 2004, and U.S. patent application Ser. No. 10/864,618, filed Jun. 9, 2004, the relevant disclosures of which are hereby incorporated by reference.

Silyl-modified polyamide compounds suitable for use as a surface-treating reagent in the methods of the present invention may be described as substantially self-hardening compositions that are capable of at least partially adhering to surfaces in the unhardened state, and that are further capable of self-hardening themselves to a substantially non-tacky state to which individual particulates will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference. In certain embodiments, the silyl-modified polyamide compound may be present in an amount in the range of from about 0.003 pounds to about 0.5 pounds per square foot of surface area of mineral surface treated on the particulates. In certain embodiments, the silyl-modified polyamide compound may be present in an amount in the range of from about 0.03 pounds to about 0.12 pounds per square foot of surface area of mineral surface treated on the particulates.

ii. Suitable Resins

In some embodiments, the surface-treating reagent may comprise a resin. Resins suitable for use in the present invention include all resins known and used in the art. Certain resins suitable for use in the present invention may be capable of increasing the water contact angle of a surface by at least about 20 degrees. Many such resins are commonly used in subterranean operations.

One resin-type coating material suitable for use in the methods of the present invention is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. Factors that may affect the decision to include a solvent include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, among other things, breaking gelled fracturing fluid films on the proppant particles, and an optional liquid carrier fluid for, among other things, reducing the viscosity of the liquid hardening agent component.

Examples of hardenable resins that can be used in the hardenable resin component include, but are not limited to, organic resins such as bisphenol A-diglycidyl ether resins, butoxymethyl butyl glycidyl ether resins, bisphenol A-epichlorohydrin resins, polyepoxide resins, novolak resins, polyester resins, phenol-aldehyde resins, urea-aldehyde resins, furan resins, urethane resins, glycidyl ether resins, and combinations thereof. The hardenable resin used may be included in the hardenable resin component in an amount in the range of from about 60% to about 100% by weight of the hardenable resin component. In some embodiments, the hardenable resin used may be included in the hardenable resin component in an amount of about 70% to about 90% by weight of the hardenable resin component.

Any solvent that is compatible with the hardenable resin and achieves the desired viscosity effect is suitable for use in the hardenable resin component in certain embodiments of the present invention. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Aqueous solvents also may be used in the methods of the present invention. In certain embodiments wherein an aqueous solvent is used, certain additives may be used, among other purposes, to aid in dispersing the resin in the aqueous solution. Selection of an appropriate solvent is dependent on, inter alia, the resin composition chosen.

As described above, use of a solvent in the hardenable resin component is optional but may be desirable to reduce the viscosity of the hardenable resin component for ease of handling, mixing, and transferring. In some embodiments, the amount of the solvent used in the hardenable resin component is in the range of from about 0.1% to about 30% by weight of the hardenable resin component. Optionally, the hardenable resin component may be heated to reduce its viscosity, in place of, or in addition to, using a solvent.

Examples of the hardening agents that can be used in the liquid hardening agent component in certain embodiments of the present invention include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol may be used. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F. The hardening agent used may be included in the liquid hardening agent component in an amount sufficient to consolidate the coated particulates. In some embodiments of the present invention, the hardening agent used may be included in the liquid hardenable resin component in the range of from about 40% to about 60% by weight of the liquid hardening agent component. In some embodiments, the hardenable resin used may be included in the hardenable resin component in an amount of about 45% to about 55% by weight of the liquid hardening agent component.

The silane coupling agent may be used, among other things, to act as a mediator to help bond the resin to formation particulates and/or proppant. Examples of suitable silane coupling agents include, but are not limited to, N-β-(aminoethyl)-γ-aminopropyl trimethoxysilane, N-2-(aminoethyl)-3-aminopropyltrimethoxysilane, 3-glycidoxypropyltrimethoxysilane, and combinations thereof. The silane coupling agent used may be included in the liquid hardening agent component in an amount capable of sufficiently bonding the resin to the mineral surface. In some embodiments of the present invention, the silane coupling agent used may be included in the liquid hardenable resin component in the range of from about 0.1% to about 3% by weight of the liquid hardening agent component.

Any surfactant compatible with the hardening agent and capable of facilitating the contacting of the resin onto mineral surfaces of the particulates may be used in the hardening agent component in certain embodiments of the present invention. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants used may be included in the liquid hardening agent component in an amount in the range of from about 1% to about 10% by weight of the liquid hardening agent component.

While not required, examples of hydrolysable esters that can be used in the hardening agent component in certain embodiments of the present invention include, but are not limited to, a mixture of dimethylglutarate, dimethyladipate, dimethylsuccinate, sorbitol, catechol, dimethylthiolate, methyl salicylate, dimethyl salicylate, dimethylsuccinate, terbutylhydroperoxide, and combinations thereof. When used, a hydrolyzable ester may be included in the hardening agent component in an amount in the range of from about 0.1% to about 3% by weight of the hardening agent component. In some embodiments a hydrolysable ester is included in the hardening agent component in an amount in the range of from about 1% to about 2.5% by weight of the hardening agent component.

Use of a diluent or liquid carrier fluid in the hardenable resin composition is optional and may be used to reduce the viscosity of the hardenable resin component for ease of handling, mixing and transferring. Any suitable carrier fluid that is compatible with the hardenable resin and achieves the desired viscosity effects is suitable for use in the present invention. Some suitable liquid carrier fluids are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other suitable liquid carrier fluids include aqueous dissolvable solvents such as, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate liquid carrier fluid is dependent on, inter alia, the resin composition chosen.

Another resin suitable for use in the methods of the present invention are furan-based resins. Suitable furan-based resins include, but are not limited to, furfuryl alcohol resins, mixtures furfuryl alcohol resins and aldehydes, and a mixture of furan resins and phenolic resins. A furan-based resin may be combined with a solvent to control viscosity if desired. Suitable solvents for use with furan-based resins include, but are not limited to 2-butoxy ethanol, butyl lactate, butyl acetate, tetrahydrofurfuryl methacrylate, tetrahydrofurfuryl acrylate, esters of oxalic, maleic and succinic acids, and furfuryl acetate.

Another resin suitable for use in the methods of the present invention is a phenolic-based resin. Suitable phenolic-based resins include, but are not limited to, terpolymers of phenol, phenolic formaldehyde resins, and a mixture of phenolic and furan resins. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol.

Another resin suitable for use in the methods of the present invention is a HT epoxy-based resin. Suitable HT epoxy-based components include, but are not limited to, bisphenol A-epichlorohydrin resins, polyepoxide resins, novolac resins, polyester resins, glycidyl ethers and mixtures thereof. An HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. Such solvents include, but are not limited to, dimethyl sulfoxide and dimethyl formamide. A co-solvent such as a dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

Another resin-type coating material suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, 3-glycidoxypropyltrimethoxysilane, and n-β-(aminoethyl)-γ-aminopropyl trimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant.

In certain embodiments, the resin may be present in an amount in the range of from about 0.003 pounds to about 0.5 pounds per square foot of surface area of mineral surface treated on the particulates. In certain embodiments, the resin may be present in an amount in the range of from about 0.03 pounds to about 0.12 pounds per square foot of surface area of mineral surface treated on the particulates.

iii. Surfactants

In some embodiments of the present invention, the surface-treating reagent may comprise a surfactant. The selection of an appropriate surfactant to hinder or prevent stress-activated reactions on a mineral surface may depend on, among other factors, the type of minerals present on that surface and/or the composition of any fluids resident in a subterranean formation where the particulates are to be placed. For example, in certain embodiments, suitable surfactants may comprise long-chain alkyl sulfates wherein the alkyl chain comprises from about 6 carbon atoms to about 21 carbon atoms. An example of one suitable long-chain alkyl sulfate is lauryl sulfate. Other suitable surfactants may comprise one or more degradable surfactants, wherein the surfactant molecules are derived from degradable polymers and contain a backbone with repeating units of degradable groups, such as esters or other derivatives, for example, such as polycarbonates, polyacetals, poly(orthoesters), or polyesteramides as the degradable hydrophobic block or tail in the surfactant molecule attached to the hydrophilic polymeric block or head group. Other suitable surfactants may include reactive surfactants, such as non-migratory surfactants or "surfmers," which comprise surfactants that carry one or more polymerizable functional groups. Examples of reactive surfactants suitable for use in the present invention are described in U.S. Patent Application Publication Number 2005/0070679, filed Aug. 30, 2004, the relevant disclosure of which is hereby incorporated by reference. The surfactant may be present in a treatment fluid utilized in the present invention in any amount that does not adversely affect the properties of the particulates. In certain embodiments, the surfactant may be present in an amount in the range of from about 0.01% to about 10% by volume of a treatment fluid comprising the particulates being treated. In certain embodiments, the surfactant may be present in an amount in the range of from about 2% to about 5% by volume of a treatment fluid comprising the particulates being treated.

iv. Other Reagents

In some embodiments, the surface-treating reagent may comprise other compounds that are capable of hindering or preventing the water-wetting of a mineral surface. Examples of suitable compounds include, but are not limited to, vinyl monomers, dienes, keto esters, amines, substituted amine hydrochlorides, amides, alcohols, organosilanes, organotitaniates, organozirconates, trivalent metal cations, tetravalent metal cations, ammonium halides, quaternary ammonium halides, ammonium salts of inorganic acids, ammonium salts of carboxylic acids, oligomeric materials, monomeric materials, oil-wetting compounds, and derivatives thereof. In some embodiments, the surface-treating reagent may comprise lecithin. In some embodiments, the surface-treating reagent may comprise a chlorosilyl group containing compound and an alkylsilane, or the reaction products thereof. In some embodiments, the surface-treating reagent may comprise an organofunctional silane and an aryl acid halide, or the reaction products thereof. Examples of suitable organofunctional silanes for these embodiments include, but are not limited to, aminofunctional silanes, ureidofunctional silanes, and epoxyfunctional silanes. Examples of suitable aryl acid halides for these embodiments include, but are not limited to, phthaloyl chloride, isophthaloyl chloride, and terphthaloyl chloride. In some embodiments, the surface-treating reagent may comprise one or more polymers of a fluoroalkyl group containing silane compound wherein the polymers include one or more dimmers or trimers. In certain embodiments, the reagent may be present in an amount in the range of from about 0.003 pounds to about 0.5 pounds per square foot of surface area of mineral surface treated on the particulates. In certain embodiments, the reagent may be present in an amount in the range of from about 0.03 pounds to about 0.12 pounds per square foot of surface area of mineral surface treated on the particulates.

b. Stress-Activated Reactivity-Increasing Reagents

In some embodiments, the surface-treating reagent may comprise compounds that are capable of increasing the tendency of a mineral surface of a particulate to undergo one or more stress-activated reactions (e.g., diagenous reactions, reactions with gelling agent molecules, etc.). Such reagents are herein referred to as "stress-activated reactivity-increasing reagents." Stress-activated reactivity-increasing reagents may comprise compounds that exhibit a tendency to be hydrolyzed in the presence of water under stress at low temperatures. Examples of such compounds may include, but are not limited to, hydrolysable esters (e.g., ceramics), polyolefins, unsaturated fats, surfactants, vinyl monomers, dienes, keto esters, amines, substituted amine hydrochlorides, amides, alcohols, organosilanes, organotitaniates, organozirconates, divalent metal cations, trivalent metal cations, tetravalent metal cations, ammonium halides, quaternary ammonium halides, ammonium salts of inorganic acids, ammonium salts of carboxylic acids, oligomeric materials, monomeric materials, and derivatives thereof. These stress-activated reactivity-increasing reagents may be capable of increasing chemical reactions in any number of ways. In certain embodiments, the reagent may react with the minerals on the surface being treated to make them more susceptible to stress-activated reactions. In other embodiments, the reagent may be deposited on the mineral surface to form a barrier or film that itself is more likely to participate in stress-activated reactions. In some embodiments of the present invention, these compounds may be placed in contact with the mineral surface of the proppant material so as to encourage subsequent chemical reactions that will generate a product (e.g., a diageneous product), which may be used for some subsequent purpose downhole. For example, a diageneous product (e.g., a mineral precipitate) may be capable of consolidating proppant or formation fines, or forming a plug that is capable of diverting and/or isolating the flow of formation fluids (e.g., water) or other treatment fluids in a portion of the subterranean formation. In certain embodiments, the reactivity-increasing reagent may be present in an amount in the range of from about 0.003 pounds to about 0.5 pounds per square foot of surface area of mineral surface treated on the particulates. In certain embodiments, the reactivity-increasing reagent may be present in an amount in the range of from about 0.03 pounds to about 0.12 pounds per square foot of surface area of mineral surface treated on the particulates.

c. Reagents for Subsequent Reactivity

In some embodiments, the surface-treating reagent may comprise a compound that may be attached to the mineral surface for participation in one or more subsequent reactions with a second compound, or a reagent that reacts to form a product compound that may be so attached to the mineral surface. Such reagents are herein referred to as "reagents for subsequent reactivity." One example of a subsequent reaction in which these attached compounds may participate is depolymerization. Examples of compounds that may be attached to the mineral surface to participate in subsequent reactions include, but are not limited to, catalysts, guar gums, polyolefins, unsaturated fats, surfactants, one or more vinyl monomers, dienes, keto esters, amines, substituted amine hydrochlorides, amides, alcohols, organosilanes, organotitaniates, organozirconates, divalent metal cations, trivalent metal cations, tetravalent metal cations, ammonium halides, quaternary ammonium halides, ammonium salts of inorganic acids, ammonium salts of carboxylic acids, oligomeric materials, monomeric materials, oil-wetting compounds, and derivatives thereof. Any of these attached compounds may contain one or more functional groups, which may be independently reactive prior to, during, or subsequent to their use in the methods of the present invention. In certain embodiments, the reagent for subsequent reactivity may be present in an amount in the range of from about 0.003 pounds to about 0.5 pounds per square foot of surface area of mineral surface treated on the particulates. In certain embodiments, the reagent for subsequent reactivity may be present in an amount in the range of from about 0.03 pounds to about 0.12 pounds per square foot of surface area of mineral surface treated on the particulates.

In certain embodiments of the present invention, the surface-treating reagent may be encapsulated with various materials, which, among other things, delays its reaction with the mineral surface and/or other substances present. Solid surface-treating reagents can be encapsulated by spray coating a variety of materials thereon. Such coating materials include, but are not limited to, waxes, drying oils such as tung oil and linseed oil, polyurethanes and cross-linked partially hydrolyzed polyacrylics. The surface-treating reagent may also be encapsulated in the form of an aqueous solution contained within a particulate porous solid material which remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters and cross-linked modified starches. To provide additional delay to the surface-treating reagents encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross-linked partially hydrolyzed acrylics.

3. Methods of Treating and Use

In practicing certain embodiments of the present invention, the surface-treating reagent may be allowed to modify the stress-activated reactivity of the mineral surface of a plurality of particulates using any method known in the art. This may be accomplished in treatments performed prior to transporting the particulates to a job site, or in a treatment performed "on-the-fly." The term "on-the-fly" is used herein to mean that one flowing stream comprising particulates is continuously introduced into another flowing stream comprising the surface-treating reagent so that the streams are combined and mixed while continuing to flow as a single stream as part of the on-going treatment at the job site. Such mixing can also be described as "real-time" mixing. One such on-the-fly mixing method would involve continuously conveying the particulates and the surface-treating reagent to a mixing vessel, for example, using a sand screw. Once inside the mixing vessel, the particulates would be contacted with the surface-treating reagent and continuously removed from the mixing vessel. In that situation, the sand screw could be used both to aid in mixing the particulates, be they gravel, proppant, or some other particulates, with the surface-treating reagent and to remove the surface-treating reagent from the mixing tank. As is well understood by those skilled in the art, batch or partial batch mixing may also be used to accomplish such coating at a well site just prior to introducing the particulates into a subterranean formation.

In some embodiments, the surface-treating reagent may be allowed to modify the stress-activated reactivity of the mineral surface of a particulate by placing it in a solution and/or treatment fluid that comprises the particulate, which may may be done prior to, during, or subsequent to introducing that solution and/or fluid into a subterranean formation or well bore. Other suitable methods for allowing the surface-treating reagent to modify the stress-activated reactivity of the mineral surface of a particulate include, but are not limited to, methods utilizing a dry mixer and solvent extraction methods. In an embodiment of the present invention involving a solvent extraction technique, the surface-treating reagent is diluted into a solvent or blend of solvents to provide certain fluid properties (e.g., viscosity) that facilitate transfer, metering, and mixing of the surface-treating reagent with the particulates being treated. However, the solvents are chosen from those that are very water soluble, with water being preferred in certain embodiments. Another example of a suitable water-soluble solvent is isopropyl alcohol. In certain embodiments, a mixture of a fatty polyamide may be diluted in the solution, among other purposes, to reduce viscosity. The solution comprising the surface-treating reagent then may be coated onto the mineral surface of the particulates by adding the solution to the particulates and stirring (or mulling) until the mixture is uniform. The treated particulates then may be introduced to a water-based fluid that extracts the solvent from the treated particulates, leaving behind an insoluble material that, among other things, may enhance the modification of the stress-activated reactivity of the treated mineral surface (e.g., further decrease the tendency of the mineral surface to undergo chemical reactions). In some embodiments of the present invention, it may be desirable to perform some additional treatment or action on the particulate prior to, during, or subsequent to allowing the surface-treating reagent to modify the stress-activated reactivity of at least a portion of a mineral surface of the particulate. For example, the mineral surface of the particulate may be heated, inter alia, in order to permit the surface-treating reagent to modify the stress-activated reactivity of the mineral surface of the particulate. In certain embodiments, at least a portion of the particulates utilized in the methods of the present invention may comprise a modified mineral surface, i.e., a mineral surface that has been modified in one or more prior treatments.

The methods of the present invention may be utilized in a variety of subterranean operations known in the art. Suitable subterreanean operations include drilling operations, pre-pad treatments, fracturing operations, gravel-packing operations, frac-packing operations, perforation operations, and the like. In certain embodiments, particulates treated utilizing the methods of the present invention may be introduced into the subterranean formation as a component of a treatment fluid (e.g., a fracturing fluid). These treatment fluids generally comprise a base fluid, which may be aqueous or non-aqueous, or a mixture thereof. Where the base fluid is aqueous, it may comprise fresh water, salt water (e.g., water containing one or more salts dissolved therein), brine (e.g., saturated salt water), or seawater. The water can be from any source, provided that it does not contain an excess of compounds that may adversely affect other components in the treatment fluid. Where the base fluid is non-aqueous, the base fluid may comprise any number of organic liquids. Examples of suitable organic liquids include, but are not limited to, mineral oils, synthetic oils, esters, and the like. Any organic liquid in which a water solution of salts can be emulsified also may be suitable for use as a base fluid in the methods of the present invention.

Suitable treatment fluids may take on a variety of physical forms, including aqueous gels, viscoelastic surfactant gels, oil gels, foamed gels, and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In certain embodiments of the present invention, the treatment fluids are aqueous gels comprised of water, a gelling agent for gelling the water and increasing its viscosity, and, optionally, a crosslinking agent for crosslinking the gel and further increasing the viscosity of the treatment fluid. The increased viscosity of the gelled, or gelled and cross-linked, treatment fluid, inter alia, may reduce fluid loss and/or allow the treatment fluid to transport increased quantities of proppant particulates.

The treatment fluids utilized in some embodiments of the present invention also may comprise one or more of a variety of well-known additives, such as gel stabilizers, breakers, fluid loss control additives, acids, corrosion inhibitors, catalysts, clay stabilizers, biocides, salts, friction reducers, surfactants, solubilizers, pH adjusting agents, additives for preventing gas hydrates (e.g., ethylene glycol, methanol), and the like. In those embodiments utilizing a treatment fluid, the particulates may be present in the treatment fluid in any amount that the treatment fluid is capable of suspending. In certain embodiments, the particulates may be present in a treatment fluid in an amount in the range of from about 0.5 ppg to about 18 ppg by volume of the treatment fluid.

The present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
    providing a plurality of particulates, at least one of which comprises a mineral surface;
    providing a surface-treating reagent comprising a stress-activated reactivity-increasing reagent; and
    allowing the surface-treating reagent to increase the tendency of at least a portion of the mineral surface to undergo one or more stress-activated reactions.

2. The method of claim 1 wherein the surface-treating reagent comprises at least one hydrolysable ester.

3. The method of claim 1 wherein the surface-treating reagent is present in an amount of about 0.003 pounds to about 0.5 pounds per square foot of surface area of the portion of the mineral surface of the particulates.

4. The method of claim 1 wherein the surface-treating reagent is present in an amount of about 0.03 pounds to about 0.12 pounds per square foot of surface area of the portion of the mineral surface of the particulates.

5. The method of claim 1 wherein the particulates comprise at least one particulate selected from the group consisting of: sand; bauxite; a fibrous material; a ceramic material; a glass material; a polymer material; a nut shell piece; a seed shell piece; a fruit pit piece; wood; a composite particulate; and any combination thereof.

6. A method comprising:
    providing a treatment fluid that comprises
        a base fluid,
        a plurality of particulates, at least one of which comprises a mineral surface, and
        a surface-treating reagent comprising a stress-activated reactivity-increasing reagent;
    allowing the surface-treating reagent to increase the tendency of at least a portion of the mineral surface to undergo one or more stress-activated reactions; and
    introducing the treatment fluid into a portion of a subterranean formation.

7. The method of claim 6 wherein the base fluid comprises at least one base fluid selected from the group consisting of: an aqueous base fluid; a non-aqueous base fluid; and any mixture thereof.

8. The method of claim 6 wherein allowing the surface-treating reagent to increase the tendency of at least the portion of the mineral surface to undergo one or more stress-activated reactions occurs during or subsequent to introducing the treatment fluid into the subterranean formation.

9. The method of claim 6 wherein introducing the treatment fluid into the portion of the subterranean formation comprises introducing the treatment fluid into the portion of the subterranean formation at or above a pressure sufficient to create or enhance one or more fractures in a portion of the subterranean formation.

10. The method of claim 9 further comprising depositing within one or more of the fractures in the portion of the subterranean formation the particulate that comprises the mineral surface whose tendency to undergo one or more stress-activated reactions has been increased.

11. The method of claim 6 wherein the surface-treating reagent comprises at least one hydrolysable ester.

12. The method of claim 6 wherein introducing the treatment fluid into the portion of the subterranean formation is part of a drilling operation.

13. The method of claim 6 wherein introducing the treatment fluid into the portion of the subterranean formation is part of a gravel-packing operation.

14. The method of claim 6 wherein the particulates comprise at least one particulate selected from the group consisting of: sand; bauxite; a fibrous material; a ceramic material; a glass material; a polymer material; a nut shell piece; a seed shell piece; a fruit pit piece; wood; a composite particulate; and any combination thereof.

15. A method comprising:
providing a treatment fluid that comprises
a base fluid, and
a plurality of particulates, at least one of which comprises a mineral surface wherein at least a portion of the mineral surface has been modified by a surface-treating reagent so as to increase the tendency of the minerals resident on the mineral surface to undergo one or more stress-activated reactions; and
introducing the treatment fluid into a portion of a subterranean formation.

16. The method of claim 15 wherein introducing the treatment fluid into the portion of the subterranean formation comprises introducing the treatment fluid into the portion of the subterranean formation at or above a pressure sufficient to create or enhance one or more fractures in a portion of the subterranean formation.

17. The method of claim 16 further comprising depositing within one or more of the fractures in the portion of the subterranean formation the particulate that comprises the mineral surface whose tendency to undergo one or more stress-activated reactions has been increased.

18. The method of claim 15 wherein introducing the treatment fluid into the portion of the subterranean formation is part of a gravel-packing operation.

19. The method of claim 15 wherein the particulates comprise at least one particulate selected from the group consisting of: sand; bauxite; a fibrous material; a ceramic material; a glass material; a polymer material; a nut shell piece; a seed shell piece; a fruit pit piece; wood; a composite particulate; and any combination thereof.

20. The method of claim 15 wherein the surface-treating reagent comprises at least one hydrolysable ester.

21. A method comprising:
providing a plurality of particulates, at least one of which comprises a mineral surface;
providing a surface-treating reagent comprising a stress-activated reactivity-increasing reagent that comprises at least one hydrolysable ester; and
allowing the surface-treating reagent to increase the tendency of at least a portion of the mineral surface to undergo one or more stress-activated reactions.

22. The method of claim 21 wherein the surface-treating reagent is present in an amount of about 0.003 pounds to about 0.5 pounds per square foot of surface area of the portion of the mineral surface of the particulates.

23. The method of claim 21 wherein the particulates comprise at least one particulate selected from the group consisting of: sand; bauxite; a fibrous material; a ceramic material; a glass material; a polymer material; a nut shell piece; a seed shell piece; a fruit pit piece; wood; a composite particulate; and any combination thereof.

* * * * *